UNITED STATES PATENT OFFICE.

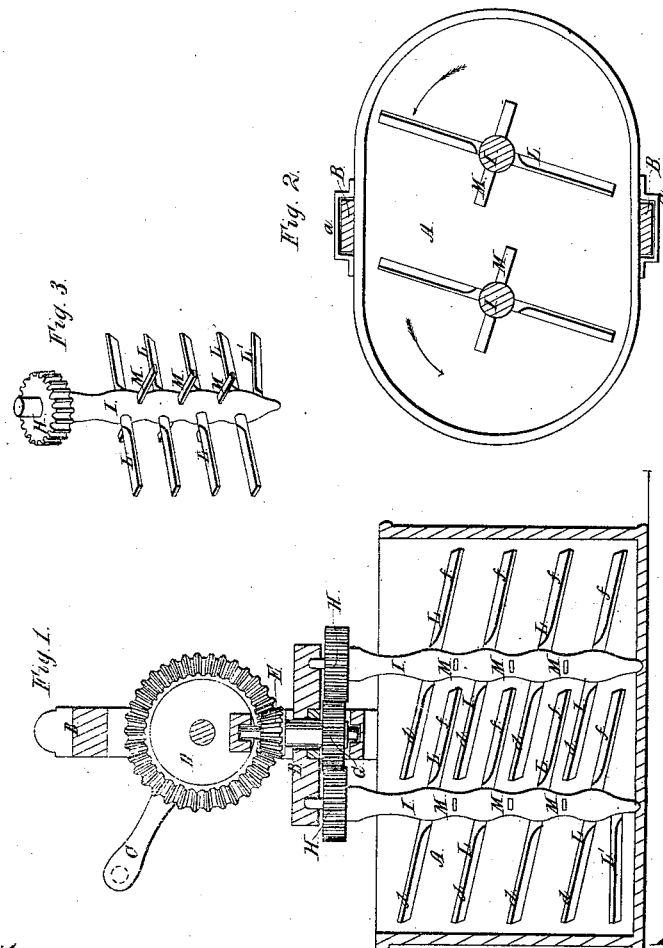

LEVI BISSELL, OF NORTH BERGEN, NEW YORK.

CHURN.

Specification of Letters Patent No. 29,052, dated July 10, 1860.

*To all whom it may concern:*

Be it known that I, LEVI BISSELL, of North Bergen, in the county of Genessee and State of New York, have invented a new and Improved Churn; and I do hereby declare that the following is a full and exact description thereof, reference being had to the accompanying drawings, making part of this specification.

Figure 1, is a longitudinal vertical section of the churn, near one side, so as to exhibit the working parts in elevation; Fig. 2, a plan of the churn body, the other parts being in horizontal section, below the driving gear; Fig. 3, a view in perspective of one of the dashers.

Like letters designate corresponding parts in all the figures.

The churn body A, is generally oblong, so as to receive two dashers compactly; and the ends thereof may be rounded into a shape concentric with the movements of the dashers, as shown in the drawings.

The driving gear is mounted in a suitable frame B, which is secured to the churn body by inserting its standards into sockets *a*, *a*, (Fig. 2,) at the sides of said churn body, so that it may be readily separated from the churn, after each churning, for convenience in getting to the butter within, and in cleaning the churn.

A winch C, on a horizontal shaft, in the frame B, turns a driving bevel-wheel D, which matches into a bevel pinion E, on a vertical shaft over the center of the churn body. On this shaft a cog-wheel G, gears into two pinions H, H, of equal size, respectively on the two dasher shafts I, I. Thus the two dashers are turned in the same absolute direction, so that their projecting arms, or wings, L, L, pass in opposite directions, where they meet, or intermatch, in the middle of the churn, substantially as represented in the drawings.

The two dashers respectively have oblique or vertically inclined arms, or wings, L, L, on opposite sides of their shafts, all those on one side being inclined upward, while those on the opposite side of the same shaft, are inclined downward. But the downwardly inclined wings of one dasher meet the upwardly inclined wings of the other dasher, in the middle of the churn, as clearly shown in Fig. 1. The wings are all of equal or nearly equal length; and the shafts of the two dashers are as near together as their wings will allow. A convenient mode of making and attaching the oppositely inclined wings, is to make each pair of opposite arms in one piece, and insert it through the shaft, as indicated in the drawings. Thus it will be seen that the downwardly inclined wings move in paths describing broad cones, pointing upward; while the upwardly inclined wings describe cones pointing downward; and as these rapidly alternate, they cut paths through the milk or cream rapidly crossing each other, thereby producing intense and effective agitation of the cream. This is increased by " feathering " the wings, either all in one way, as in Fig. 1, or those of one dasher in the opposite direction to those of the other dasher, as shown in Fig. 2, so that when the wings of the two dashers meet, one set will force the cream downward, and the other upward, thereby greatly increasing the violence of the commotion. And the opposite sets of wings on the same dasher, may be " feathered " in contrary directions, so as still more to increase the opposing forces. The agitation in the middle of the churn being much more violent, and the centrifugal action of the two dashers neutralizing each other there, the effect is to force the cream in larger quantities to the ends, and by the tendency of the cream to tumble back to the middle of the churn, by the force of gravity, a still more rapid interchanging of all parts of the cream results thereby. And from the same causes, the butter, as it is formed, lodges at the ends of the churn, where it interferes the least with the movement of the dashers. Another effect of the oppositely inclined dasher wings is to alternately force the cream in rapid succession both up and down, so that scarcely any slopping or waving of the cream up the sides of the churn body takes place, whereby a cover to the churn is hardly necessary, although I usually employ one to keep out the dust. This effect may be enhanced or diminished by the different ways of " feathering " the wings, as above indicated. To still further allay any swaying or slopping of the cream, and, by constantly applying counter checks to the agitation of the cream, as produced by the inclined wings of the dashers, to more rapidly crush or separate the butter globules, I employ intermediate horizontal wings M, M, projecting from the shafts at right-angles to the projection of the said inclined wings. These intermediate wings are also flattened horizontally, so as to disturb the cream, in that way, as little as possible. They also cut the cream in paths differing entirely from those cut by the inclined wings.

I do not claim the employment of two dashers, with horizontal, or right-angled, intermatching wings or arms; nor do I claim inclining the dasher wings or arms to their shaft alone; but

What I claim as my invention and desire to secure by Letters Patent is—

The combination and arrangement of the oppositely inclined sets of dasher wings L, L, following each other on their respective shafts, while those of one dasher alternate and intermatch with those of the other dasher, and the intermediate, horizontal dasher wings M, M, substantially in the manner and for the purposes herein specified.

LEVI BISSELL.

Witnesses:
J. FRASER,
S. J. ALLIS.